Aug. 23, 1949.  G. K. CZARNIKOW  2,480,001
MICROSCOPE FINE ADJUSTMENT MECHANISM
Filed Dec. 30, 1946
2 Sheets-Sheet 1
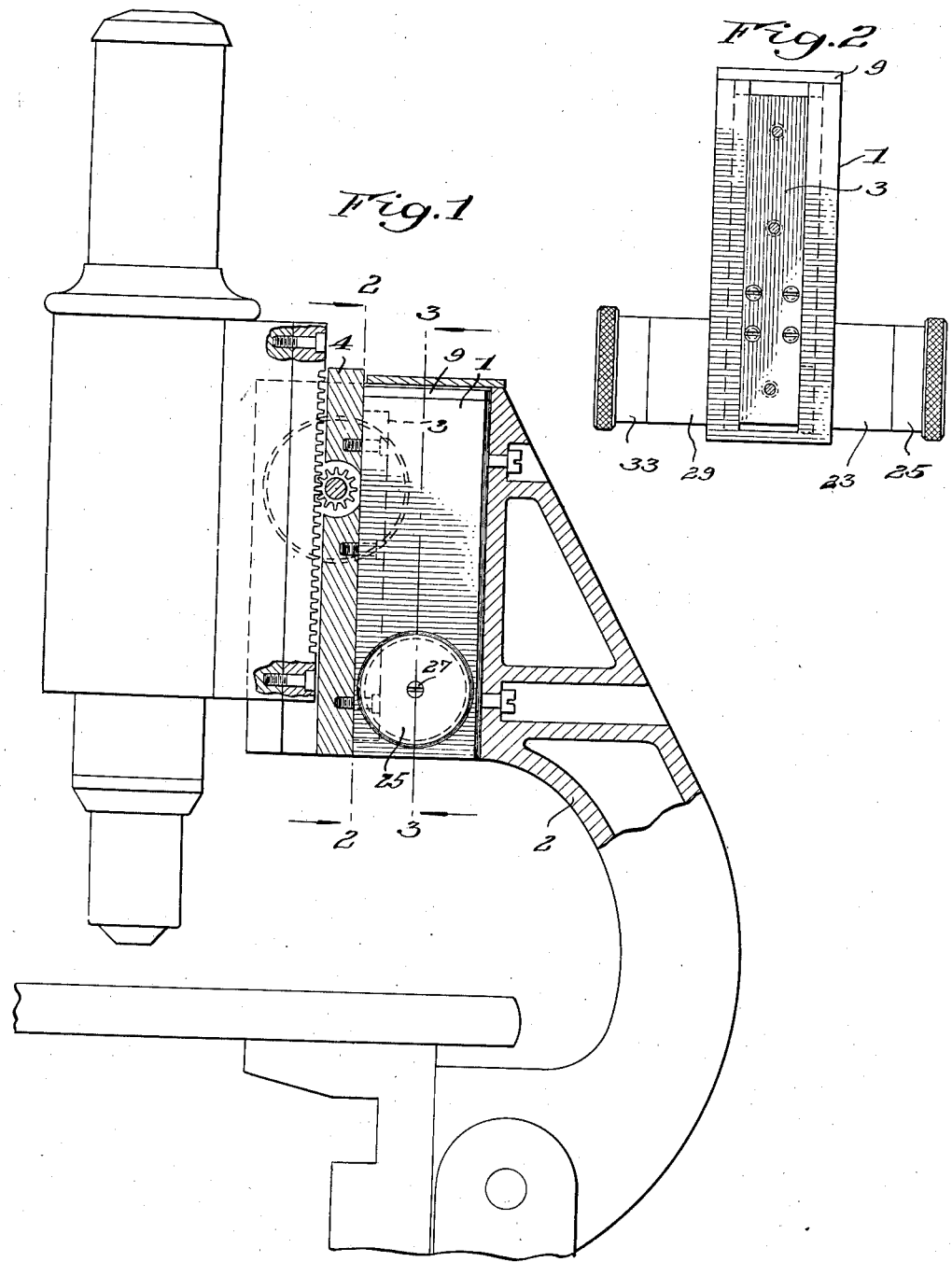
INVENTOR.
George K. Czarnikow
BY Harold E. Stonebraker
his Attorney Aug. 23, 1949.  G. K. CZARNIKOW  2,480,001
MICROSCOPE FINE ADJUSTMENT MECHANISM
Filed Dec. 30, 1946  2 Sheets-Sheet 2
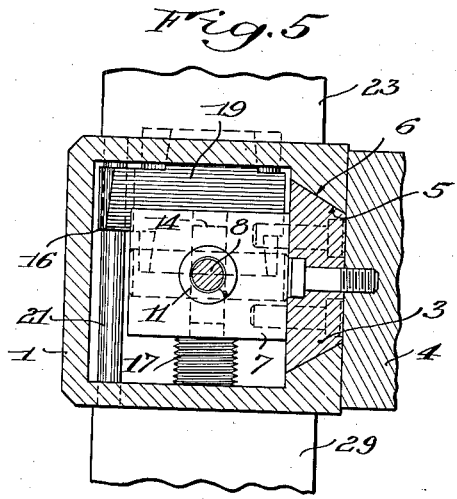
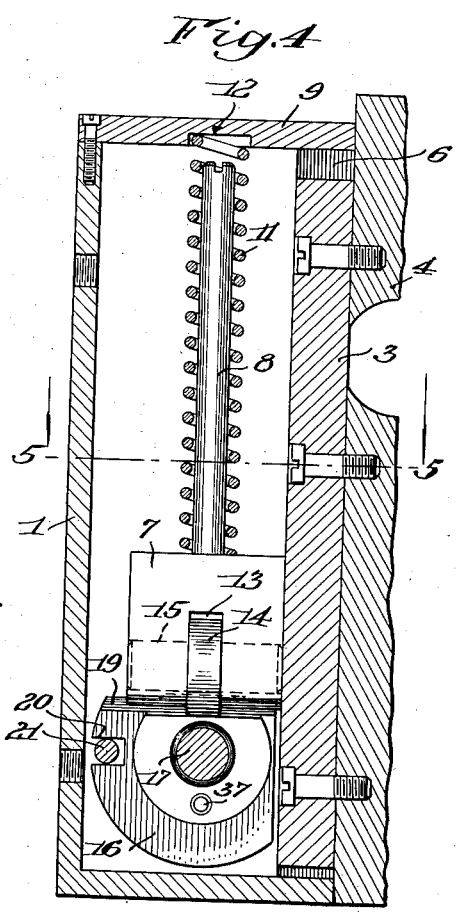
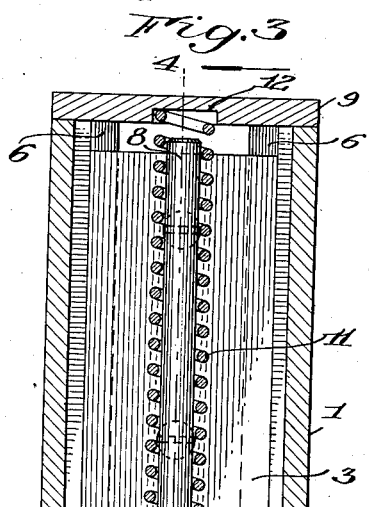
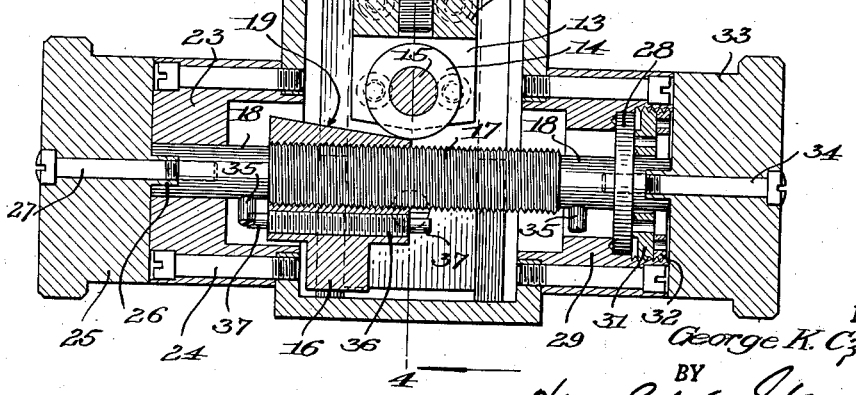
INVENTOR.
George K. Czarnikow
BY Harold E. Stonebraker
his Attorney Patented Aug. 23, 1949

2,480,001

UNITED STATES PATENT OFFICE 2,480,001

MICROSCOPE FINE ADJUSTMENT MECHANISM

George K. Czarnikow, Rochester, N. Y., assignor to Wollensak Optical Company, Rochester, N. Y., a corporation of New York Application December 30, 1946, Serial No. 719,293

8 Claims. (Cl. 74—89)

This invention relates to a fine adjustment mechanism for microscopes, and has for its object to afford a simple and practical structure that is durable, and efficient in bringing about the necessary micrometer adjustment of a microscope body.

More particularly, the invention has for its purpose to afford a microscope fine adjustment mechanism having few parts, and which can be produced and assembled more readily and at a lower cost than structures heretofore available for the purpose.

Another object of the invention is to afford an arrangement that is highly accurate in operation, readily controllable, and which will enable the necessary adjustments within the required limits without possibility of the parts becoming inoperative from excessive wear or disarrangement.

A further purpose of the invention is to provide a construction that will operate certainly and efficiently over an indefinite period, due to the absence of delicate parts or connections and a relationship of the moving elements that effectively prevents any jamming, breaking, or other disarrangement that would render the mechanism inoperative or unreliable.

To these and other ends, the invention consists in the construction and arrangement of parts that will appear clearly from the following description when read in conjunction with the accompanying drawings, the novel features being pointed out in the claims following the specification.

In the drawings:

Fig. 1 is a vertical sectional view showing a preferred embodiment of the invention incorporated in a microscope;

Fig. 2 is a vertical sectional view on the line 2—2 of Fig. 1;

Fig. 3 is a vertical sectional view on the line 3—3 of Fig. 1;

Fig. 4 is a vertical sectional view on the line 4—4 of Fig. 3, and

Fig. 5 is a horizontal sectional view on the line 5—5 of Fig. 4.

Referring more particularly to the drawings in which like reference numerals refer to the same parts throughout the several views, I designates the housing in which the fine adjustment mechanism is located, the housing I being suitably fastened to the usual supporting arm 2 of the microscope, while 3 designates a supporting plate to which is suitably attached the coarse adjustment mechanism and microscope body 4, the supporting plate 3 having bevelled edges 5 that engage and are guided vertically on correspondingly bevelled surfaces 6 of the housing.

It will be understood that the supporting plate 3 has mounted thereon the coarse adjustment mechanism and microscope body 4, which is moved by the coarse adjustment mechanism as usual in the art, the entire microscope body assembly including the coarse adjustment mechanism and the supporting plate 3 being movable upwardly or downwardly for micrometer or fine adjustment by the mechanism that will now be described in detail.

Mounted on the supporting plate 3 and fixedly attached thereto is a block 7, provided with an upwardly projecting guide rod 8 threaded in and fixed to the block 7. The guide rod 8 terminates in proximity to the cover plate or top 9 of the housing, while 11 designates a coil spring surrounding the guide rod 8 with its lower end resting on the block 7 and its upper end nested in a recess 12 of the cover plate 9, the spring 11 function to press the block 7 and supporting plate 3 downwardly at all times, while said parts are moved upwardly against the action of the spring 11 by the mechanism now to be described.

The block 7 is bifurcated at its lower end as at 13 to receive an anti-friction roller 14 which is held in place on the block by means of a bearing pin 15 secured at its opposite ends in openings provided in the block on opposite sides of the bifurcated portion 13, and the anti-friction roller 14 is engaged by adjusting means preferably in the form of an inclined cam that is operable to move the block 7 and associated parts upwardly to any desired extent within the limits of the permitted adjustment, as determined by the structure to be described presently.

To effect the necessary upward adjustment of the anti-friction roller 14 and block 7 without the necessity of bell-cranks or pivoted levers, there is provided a nut 16 engaging a threaded portion 17 on a spindle 18, and provided on its upper face with an inclined cam surface 19 on which the anti-friction roller 14 rests, the nut 16 being held against rotation and movable endwise upon turning of the spindle 18 to effect the necessary upward movement of the block 7.

In order to prevent turning of the nut 16, it is provided with a pocket or recess 20 at one side of its periphery, while 21 designates a guide rod fixed in the housing and extending through the pocket 20, acting to prevent turning of the nut 16 while permitting its endwise travel on the guide rod 21 when the spindle 18 is rotated.

The spindle 18 has one end extending through a bearing portion 23 that is secured to the housing 1 by means of bolts 24. 25 designates a knob or handle that has a lug 26 which interlockingly engages with an opening in the adjacent end of the spindle, while 27 designates a bolt for holding the handle 25 against the bearing portion 23 and engaged with the spindle. The opposite end of the spindle 18 carries a collar 28 that engages a shoulder of the bearing portion 29, the collar 28 being held against the shoulder 29 by an adjustable sleeve 31 held in place by locking nut 32, while 33 designates a knob or handle having interlocking engagement with the adjacent end of the spindle and held in place by the bolt 34.

In this manner, the handles 25 and 33 are rigidly connected to the spindle 18 for turning the latter and thereby effecting endwise travel of the nut 16 on the threaded portion 17, and when the nut 16 and its inclined cam surface 19 are moved to the right with reference to Fig. 2, the anti-friction roller 14, block 7, and supporting plate 3 are elevated to an extent depending on the amount of rotation of the spindle 18 and corresponding endwise movement of the nut 16 and cam surface 19, and when the spindle 18 is turned in the opposite direction, the cam surface 19 is moved in a direction away from the anti-friction roller 14, permitting downward movement of the block 7 which is held at all times with the anti-friction roller 14 in contact with the inclined cam surface 19 through the action of the aforementioned spring 11.

It is important to provide means for limiting endwise movement of the nut 16 in both directions in a manner that is both accurate and effective, and will not permit jamming of the parts or other injury to the mechanism, and this is accomplished by providing the spindle 18 at both ends of the threaded portion 17 with radially extending stop elements or pins 35 adapted for engagement by projections on the nut 16. To accomplish this, a rod 36 is threaded in a longitudinal opening in the nut 16 with its ends 37 projecting beyond the nut at each end and arranged to engage alternately with the stop pins 35 when the nut reaches the limit of its travel in either direction. Thus the endwise movement of the nut is determined by one of the stop pins 35 which rotates with the spindle, striking one of the projections 37 as the latter moves endwise into and across the path of circular travel of the corresponding stop pin, and these stop elements coming together in the manner described positively limit movement of the nut in a way that permits easy reverse movement when necessary, and definitely prevents any jamming of the parts because either pin 35 is free to move away from its stop 37 when the spindle is turned in the opposite direction. Thus the limiting of movement of the nut does not depend on engagement of two flat surfaces, one rotating against the other, as in prior structures which easily results in jamming of the mechanism and injury to the parts, and with the present structure, there is no possibility of a jamming action between any parts and the spindle is always free to be turned in either direction even though carried to the limit of its travel where one of the stop pins functions to prevent further movement.

While the invention has been described with reference to the particular construction shown, it is not limited to the details herein disclosed, and this application is intended to cover such modifications or departures as may come within the purposes of the improvement and the scope of the following claims.

I claim:

1. A microscope fine adjustment mechanism comprising a housing, a supporting plate adjustable vertically of the housing, a block carried by the supporting plate, means for elevating the block comprising a spindle rotatably mounted in the housing beneath said block in a plane perpendicular to the path of movement of the supporting plate, a threaded portion on said spindle, a nut engaging said threaded portion, said nut having an inclined cam surface operatively engaging said block to effect upward movement thereof when the spindle is rotated and the nut moved endwise thereof, and guiding means engaging said nut and acting to prevent turning movement of the latter on the spindle.

2. A microscope fine adjustment mechanism comprising a housing, a supporting plate adjustable vertically of the housing, a block carried by the supporting plate and having a bifurcated lower portion, an anti-friction roller journalled in said bifurcated portion, a spindle rotatably mounted in the housing beneath said block in a plane perpendicular to the path of movement of the supporting plate, a threaded portion on the spindle, a nut engaging said threaded portion, said nut having an inclined cam surface engaging said anti-friction roller, and guiding means engaging said nut and acting to prevent turning movement of the latter on the spindle.

3. A microscope fine adjustment mechanism comprising a housing, a supporting plate adjustable vertically of the housing, a block carried by the supporting plate and having a bifurcated lower portion, an anti-friction roller journalled in said bifurcated portion, a spindle rotatably mounted in the housing beneath said block in a plane perpendicular to the path of movement of the supporting plate, a threaded portion on the spindle, a nut engaging said threaded portion, said nut having an inclined cam surface engaging said anti-friction roller, guiding means engaging said nut and acting to prevent turning movement of the latter on the spindle, a guide rod secured to the top of said block and extending upwardly to a point in proximity to the top of the housing, and a spring surrounding said guide rod engaging the top of the block and the top of the housing for actuating the block and supporting plate downwardly.

4. A microscope fine adjustment mechanism comprising a housing, a supporting plate adjustable vertically of the housing, a block carried by the supporting plate, a guide rod fixed to the block and extending vertically of the housing, a spring surrounding said guide rod and engaging the top of said block and the top of the housing for actuating the block and supporting plate downwardly, an anti-friction element mounted on said block, and means for elevating said supporting plate comprising a spindle rotatably mounted in the housing in a plane perpendicular to the direction of movement of the supporting plate, a threaded portion on the spindle, a nut engaging said threaded portion, said nut having an inclined cam surface engaging said anti-friction element, stop elements carried by the spindle at the ends of said threaded portion and extending radially from the spindle for rotative movement therewith, guide means engaging the nut to prevent turning of the latter on the spindle during movement endwise of the threaded portion, and projections extending from opposite ends of the nut, said projections being movable endwise into and across the paths of said rotatively movable stop elements respectively when the nut reaches the limits of its endwise movement in either direction.

5. A microscope fine adjustment mechanism comprising a housing, a supporting plate adjustable vertically of the housing, a block carried by the supporting plate, means for elevating the block comprising a spindle rotatably mounted in the housing beneath said block in a plane perpendicular to the path of movement of the supporting plate, a threaded portion on said spindle, a nut engaging said threaded portion, said nut having an inclined cam surface operatively engaging said block to effect upward movement thereof when the spindle is rotated and the nut moved endwise thereof, guiding means engaging said nut and acting to prevent turning movement of the latter on the spindle, stop elements carried by the spindle at the ends of the said threaded portion and extending radially from the spindle for rotative movement therewith, and projections extending from opposite ends of the nut, said projections being movable endwise into and across the path of said rotatively movable stop elements respectively when the nut reaches the limits of its endwise movement.

6. A microscope fine adjustment mechanism comprising a housing, a supporting plate adjustable vertically of the housing, a block carried by the supporting plate and having a bifurcated lower portion, an anti-friction roller journalled in said bifurcated portion, a spindle rotatably mounted in the housing beneath said block in a plane perpendicular to the path of movement of the supporting plate, a threaded portion on the spindle, a nut engaging said threaded portion, said nut having an inclined cam surface engaging said anti-friction roller, guiding means engaging said nut and acting to prevent turning movement of the latter on the spindle, stop elements carried by the spindle at the ends of said threaded portion and extending radially from the spindle for rotative movement therewith, and projections extending from opposite ends of the nut, said projections being movable endwise into and across the path of said rotatively movable stop elements respectively when the nut reaches the limits of its endwise movement.

7. A microscope fine adjustment mechanism comprising a vertically adjustable member, a spindle rotatably mounted in a plane perpendicular to the path of movement of said adjustable member, a threaded portion on said spindle under said vertically adjustable member, a nut located under said vertically adjustable member and engaging said threaded portion, said nut having an inclined cam surface operatively engaged with said adjustable member for moving the latter and a slot at one side edge extending throughout the length of the nut, and a fixed guide rod extending through said slot and acting to prevent turning movement of the nut as it moves along the spindle.

8. A microscope fine adjustment mechanism comprising a vertically adjustable member, means for elevating the vertically adjustable member comprising a spindle rotatably mounted in a plane perpendicular to the path of movement of said adjustable member, a threaded portion on said spindle under said vertically adjustable member, a nut located under said vertically adjustable member and engaging said threaded portion, said nut having a slot at one side edge extending throughout the length of the nut, a fixed guide rod extending through said slot and acting to prevent turning movement of the nut as it moves along the spindle, stop elements carried by the spindle at the ends of said threaded portion and extending radially from the spindle for rotative movement therewith, and a rod threaded endwise of the nut at the bottom thereof and having projections extending beyond opposite ends of the nut, said projections being movable endwise into and across the path of said rotatively movable stop elements respectively when the nut reaches the limits of its endwise movement.

GEORGE K. CZARNIKOW.

REFERENCES CITED

The following references are of record in the file of this patent:

UNITED STATES PATENTS

| Number | Name | Date |
|---|---|---|
| 754,954 | Dieckmann | Mar. 15, 1904 |
| 1,040,774 | Schamel | Oct. 8, 1912 |
| 1,655,133 | Clase | Jan. 3, 1928 |
| 2,057,187 | Gallasch | Oct. 13, 1936 |